United States Patent [19]

Holka et al.

[11] 4,305,614
[45] Dec. 15, 1981

[54] CONVERTIBLE VEHICLE BODY

[75] Inventors: Thomas C. Holka, Farmington Hills; Thomas E. McNally, Mt. Clemens, both of Mich.

[73] Assignee: Ford Motor Company, Dearborn, Mich.

[21] Appl. No.: 137,347

[22] Filed: Apr. 7, 1980

[51] Int. Cl.³ .............................................. B60R 7/04
[52] U.S. Cl. ............................... 296/37.16; 296/106; 296/146; 403/DIG. 4
[58] Field of Search .................. 296/99 R, 106, 32.16, 296/146; 403/DIG. 4, 322, 326, 328; 16/49, 82

[56] References Cited

U.S. PATENT DOCUMENTS

| | | | |
|---|---|---|---|
| 2,775,137 | 12/1956 | Chung | 403/DIG. 4 |
| 3,181,911 | 5/1965 | Peras | 296/37.16 |
| 3,298,731 | 1/1967 | Sangimino | 296/99 |
| 3,781,059 | 12/1973 | Davis | 296/27 |
| 4,099,293 | 7/1978 | Pittasch | 403/322 |
| 4,183,575 | 1/1980 | Hayashi | 296/106 |
| 4,261,612 | 4/1981 | Chrysler | 296/37.16 |

FOREIGN PATENT DOCUMENTS 1391051  1/1964  France ........................... 296/37.16

*Primary Examiner*—Richard A. Bertsch
*Assistant Examiner*—John A. Carroll
*Attorney, Agent, or Firm*—John J. Roethel; Clifford L. Sadler

[57] ABSTRACT

A vehicle having a quick-release hinge mechanism for a closure or door for an ingress/egress opening at the body rear end to facilitate the interchange of different rear end structures without tools or special equipment to obtain optional rear end appearances and functions. When a rear door installed on the vehicle is lifted about the axis of the hinge mechanism, it rises with the assistance or one or more gas spring cylinders that when fully extended restrict the angle of door opening. In the up position, the cylinders may be disconnected from fittings located on the door. With these disconnected, the door can be lifted an additional 10 to 15 degrees allowing a cam action lock hinge mechanism to be actuated to release components of the hinge device. This permits removal of the door from the body and rapid substitution of another rear end structure or door.

3 Claims, 5 Drawing Figures

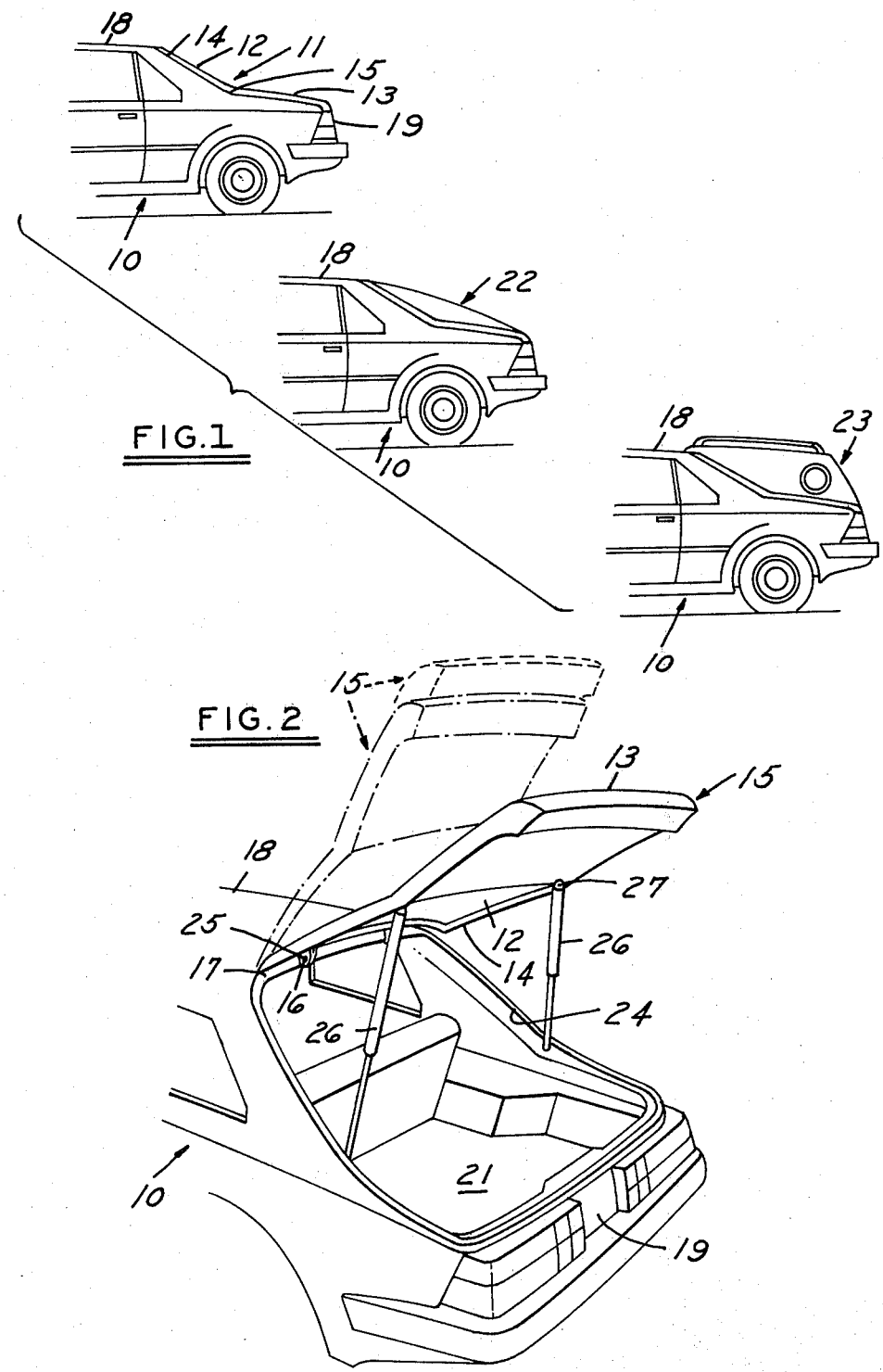

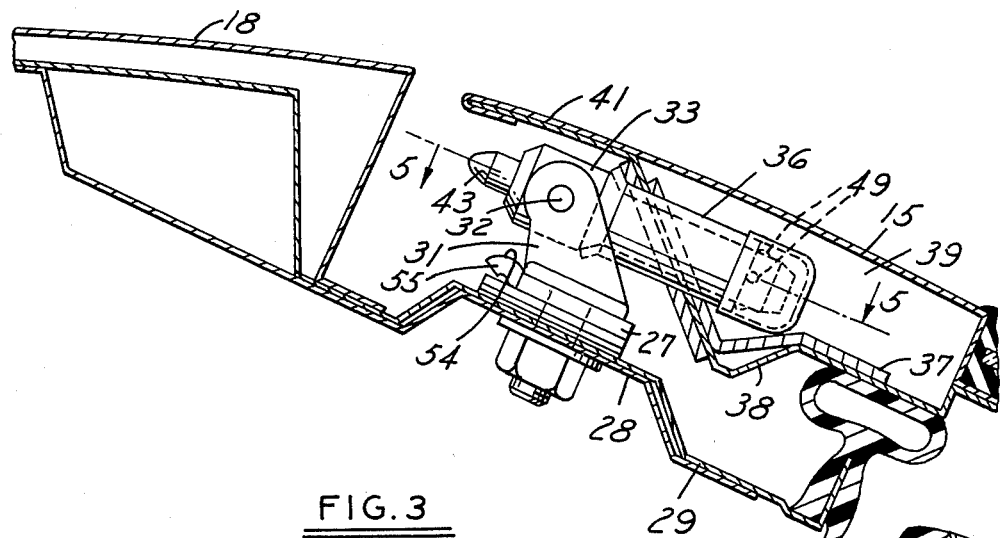
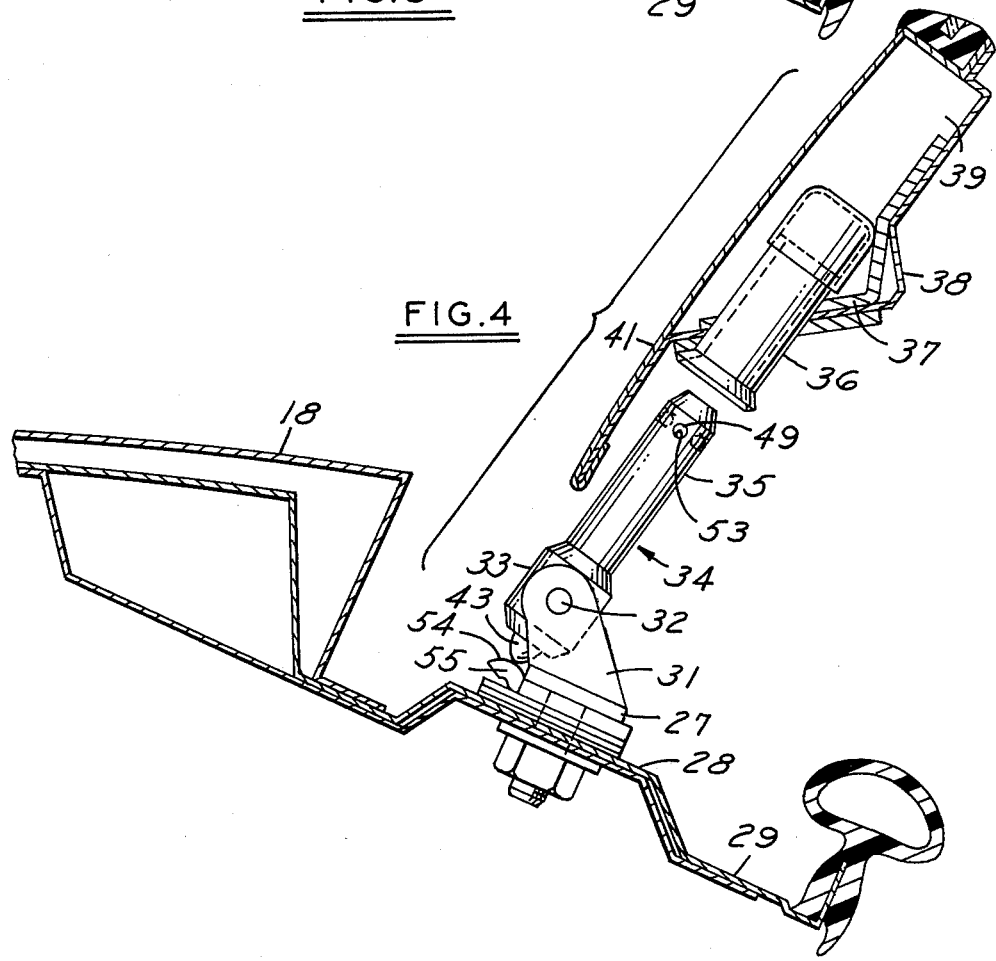

CONVERTIBLE VEHICLE BODY

BACKGROUND OF THE INVENTION

This invention relates to the rapid conversion of a rear end of a base vehicle body into any one of several styling configurations.

The concept of vehicle bodies that may be converted, for example, from a sedan into a station wagon, is known. Representative prior art patents are U.S. Pat. No. 3,419,304 issued Dec. 31, 1968 to V. Sangimo for an "Auto Wagon"; U.S. Pat. No. 3,781,059 issued Dec. 25, 1973 to W. A. Davis for a "Removable Vehicle Body Closure With Dual Use Installation" and U.S. Pat. No. 3,820,839 issued June 28, 1974 to H. Molatalab for an "Automobile Convertible Either to Sedan or Station Wagon".

As exemplified by the disclosure of U.S. Pat. No. 3,419,304 the vehicle conversion may be obtained by a flexible roof cover and side windows and posts serving to support the roof cover that are adapted to disappear into the side panels of the vehicle body. Such a system become quite complex and expensive to manufacture and maintain.

The disclosure of U.S. Pat. No. 3,820,839 is limited to a system in which a panel section at the rear end of the vehicle body is slidable and pivotable on guide rails. In one position, the panel section defines the rear window and deck lid of a conventional sedan; in another position the panelsection forms a rear roof extension defining a station wagon configuration.

The disclosure of U.S. Pat. No. 3,781,059 is related to a vehicle body closure that may be removed and flipped over to either define a vehicle body having at its rear end a sedan configuration or a modified station wagon configuration. Although the last mentioned conversion structures have at the advantage that they are carried on the vehicle and require no separate storage facilities, advantage may be outweighed by the fact that both sides of the reversible panel sections are exposed when in use to road grime and the effects of inclement weather. The present invention proposes that the conversion units of different configuration be independently interchangeable and that they be provided with a quick release hinge mechanism to permit the vehicle operator to interchange them without tools or special equipment. This would make possible the manufacture of a plurality of optional rear end appearances and functions. Possible options would include a fast-back version, a notchback version, a station wagon version and a camper-top version.

SUMMARY OF THE INVENTION

The present invention relates to a vehicle body having a roof, an ingress/egress opening extending downwardly from the rear edge of the roof, and a closure means for the opening that is contoured to provide a distinctive configuration to the rear end of the vehicle body. The closure means is hinged to the vehicle roof for swinging movement about a substantially horizontal hinge axis. The closure means is swingable about the hinge axis from a position fully closing the opening to a normal open position and further to a position beyond the normal open position. The hinge means hinging the closure means to the roof structure comprises at least a pair of laterally spaced, quick release hinge devices. The hinge means includes locking means that locks each hinge device against quick release during swinging movement between the fully closed normal open position and vice versa. Each hinge device includes a cam means and a cam responsive means coacting to release the locking means in response to swinging movement of the closure means to a position beyond its normal open position. A counterbalance means extends between the vehicle body and the closure means. The counterbalance means is disconnectable to permit movement of the closure means beyond its normal open position.

DESCRIPTION OF THE DRAWINGS

Other objects, advantages and features of the present invention will become more apparent as the description proceeds, reference being had to the accompanying drawings, wherein:

FIG. 1 represents three side elevations of a vehicle illustrating a hatchback, a fastback and a station wagon rear end configuration;

FIG. 2 is a fragmentary perspective view of the rear end of the vehicle illustrating a rear end closure means for an ingress/egress opening in the rear end of the vehicle body and showing in solid outline the closure means in normal opened position and in dot-dash outline showing the closure means raised above the normal opened position;

FIG. 3 is an enlarged vertical section illustrating the relationship of the hinge components in closure means closed position;

FIG. 4 is an enlarged view illustrating the hinge device components disengaged for quick removal of the closure means from the vehicle body.

DETAILED DESCRIPTION OF THE INVENTION

Figure 5:
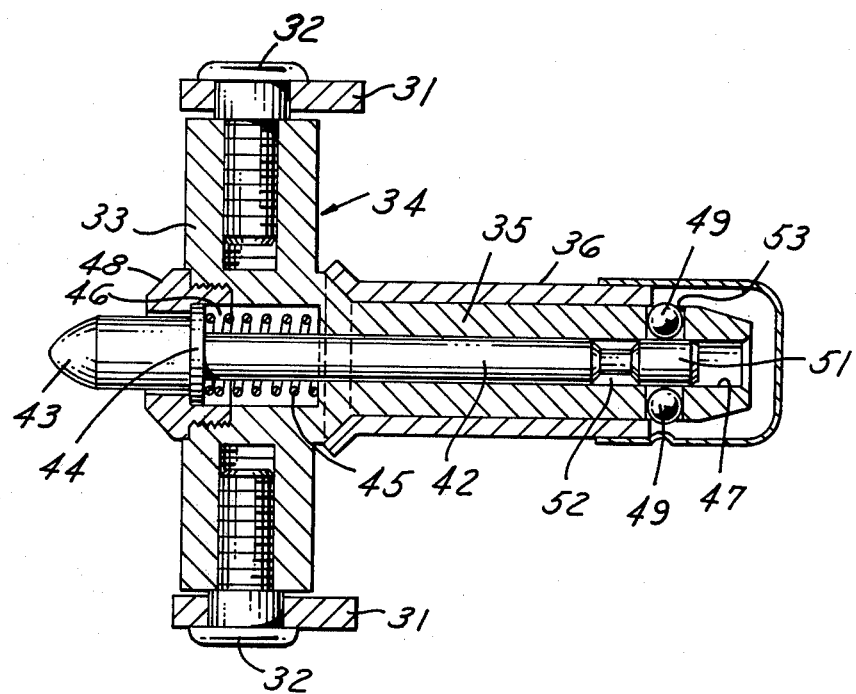
FIG. 5 is a section view taken substantially on the line 5—5 of FIG. 3 illustrating the internal details of a preferred hinge device providing the quick release feature.

Referring now to the drawings, more particularly to FIG. 1, there is shown the rear end of a basic vehicle body 10 having three different configurations. From top to bottom, the uppermost vehicle rear end configuration is termed a notchback, a general term for configurations in which the rear window 12 slopes downwardly at a somewhat steeper angle than the panel 13 covering the vehicle luggage compartment area. If, as shown in FIG. 2, the window frame 14 of the window 12 and the panel 13 are integral, forming a rear or third door 15 for a two door sedan: are hinged by hinge devices 16 to the rear edge 17 with the vehicle roof structure 18; and the third door 15 extends from the roof structure 18 to the rear vertical panel 19 of the vehicle body; the vehicle may also be known as a hatchback. The third door provides access to the rear storage compartment area 21 of the vehicle body 10.

A vehicle body having a rear end 22 which is shown as the middle vehicle in FIG. 1 is generally termed a fastback model because of its convex configuration. A vehicle body having a rear end 23 which is shown as the bottom vehicle in FIG. 1 is generally termed a station wagon model because of it is generally boxlike shape which facilitates its use for hauling bulky objects.

Referring again more particularily to FIG. 2, there is shown the vehicle body 10, the ingress/egress opening 24 extending downwardly from the roof 18 and the closure means or third door 15 swingable about a horizontal hinge axis defined by the pivot pins 25 of a pair of laterally spaced hinge devices 16, only one of which is visible. The closure means or third door is swingable about the hinge pins 25 from a position fully closing the ingress/egress opening 24 to a normal fully opened position as shown in solid outline in FIG. 2. When the third door is lifted, it rises with assistance of one or more gas spring cylinders 26 that also control or restrict the angle of the door opening when the cylinders reach maximum extension. In the normal fully opened position, the cylinders 26 may be removed from snap-on ball joint connections 27 located at either side of the door 15. With the cylinders disconnected, the door 15 may be lifted an additional 10 to 15 degrees to the dot and dash outline position.

FIGS. 3, 4 and 5 disclose the specifics of the quick release hinge devices 16. Each hinge device 16 comprises an elongated support bracket 27 bolted on a laterally extending elongated platform portion 28 of a wide trough extension 29 of the roof structure 18. The support bracket 27 has at each end an upstanding leg 31 in which is journalled a shoulder bolt 32 that is threaded into each end of a cross bar 33 of a substantially cruciform body 34 of a hinged device 16. The cross bar 3 and the shoulder bolts 32 form the hinge pin 25 of each hinge device 16. The body 34 has a centrally positioned tubular portion 35 extending perpendicularly to the axis of rotation of the cross bar 33.

The tubular portion 35 is adapted to telescopically, externally receive thereover a cylindrical sleeve 36 mounted on a reinforcement plate 37 that reinforces the area around an aperture in the wall 38 of a pocket 39 adjacent the upper lateral edge of the third door 15. As best seen in FIG. 4, the sleeve 36 opens outwardly of the pocket 39 beneath the hem flange 41 of the third door 15 structure.

The tubular portions 35 of the cruciform body 34 houses an elongated pin 42 that has an enlarged cam follower 43 at its exposed end, the left end as viewed in FIG. 4. At the base of the cam follower is a flange 44 that bears against a compression spring 45 housed within a cylindrical chamber 46 axially aligned with the tube 47 in the tubular portion 35 in which the elongated pin 42 is slidably journalled. A retention nut 48 retains the spring and the pin 42 with its cam follower end 43 within the tubular portion 35 of the cruciform body 33. As its right end is viewed in FIG. 5, the tubular portion 35 contains a plurality of balls 49 equally spaced around its circumference. As shown in FIG. 5, when the detent balls 39 are engaged by the end or land portion 51 of the pin 42 they are forced outwardly a sufficient distance to prevent withdrawal of the sleeve 36 from over the tubular portion 35. If the pin 42 is moved to the right as shown in FIG. 5, the balls would be permitted to drop into a recessed portion 52 on the pin 42 thus permitting the sleeve 36 to be moved telescopically off the tubular portion 35 of the cruciform body of the hinge device. It would be understood that the lateral apertures 53 in the sleeve body 35 in which the detent balls 49 are adapted to move inwardly and outwardly are deformed at their out ends sufficiently to prevent the balls from falling out of the assembly.

Movement of the pin 42 in the tube 47 results from engagement of its cam follower end 43 with a cam surface foot 54 on a curved appendage 55 on the support bracket 27. When the vehicle body third door 15 is in a closed position relative to the roof structure 18, as shown in FIG. 3, the cam follower end 43 of the pin 42 is in a protracted condition and the ball detents 49 are outwardly extended to prevent telescopic removal of the sleeve 46 from the tubular portion 35. If the door 15 is lifted to a normally opened position, the position shown in solid outline in FIG. 2, the cam follower end 43 of the pin 42 remains protracted. If the gas spring cylinders 26 are disconnected so that the door can be raised an additional 10 to 15 degrees, the cam follower end 43 of the pin 42 engages the cam surface 54 of the appendage 55 on the support bracket 47 and causes the pin to be retracted or moved to the right as shown in FIG. 5. As explained, this permits the detent balls 49 to retract within the periphery of the tubular portion 35 so that the sleeve 36 may be telescopically removed from its assembled relationship to the tubular portion 35. This is shown in FIG. 4. This permits the third door 15 to be removed from the vehicle body. If desired, one of the other rear end structures, such as the fastback structure 22 or the station wagon structure 23 may then be substituted for the notchback structure 11.

When the door 15 is reinstalled or one of the other structures is installed, a reverse action occurs. The hinge devices 16 are reassembled when the tubular portions 35 of the cruciform bodies located on the body opening frame are inserted into the cylindrical sleeves 36 located on the door 15 or other rear end structure. The geometric action of lowering the door 15 to apply the upper attachment 27 of the gas spring cylinders causes the hinge devices to lock up, i.e., the detent balls 49 to project into abutting relation to the end of the sleeve 36 thereby preventing removal of the latter from the tubular portion 35 of the hinge device 16. This forms a secure hinge assembly. The reattachment of the gas cylinders assures the securing of the door 15 to the body at the hinge devices 16 as long as the air spring cylinders 26 remain in place.

It is to be understood this invention is not limited to the exact construction illustrated and described above, but that various changes and modifications may be made without departing from the spirit and scope of the invention as defined in the appended claims.

We claim:

1. A vehicle body having a roof, an ingress/egress opening extending downwardly from the rear edge of the roof, and a closure means for the opening that is contoured to provide a distinctive configuration to the rear end of the vehicle body;

hinge means hinging the closure means to the vehicle roof for swinging movement about a hinge axis;

the closure means being swingable about the hinge axis from a position fully closing the opening to a normal open position and to a position beyond the latter;

the hinge means comprising at least a pair of laterally spaced quick release hinge devices.

each quick release hinge device comprising a base portion mounted on a frame structure framing the ingress/egress opening;

a cylindrical sleeve fixedly mounted on the closure means contiguous to the vehicle roof body;

and a tubular member pivotably mounted on the base portion to telescopically receive the cylindrical sleeve thereover;

each hinge device including a locking means that locks the hinge device against quick release during swinging movement between fully closed and normal open position, and vice-versa;

the locking means of each hinge device comprising retractable detent means on the tubular member preventing withdrawal of the sleeve means from the tubular member in nonretracted condition of the detent means;

each hinge device including a cam means and a cam responsive means coacting to retract the detent means in response to swinging movement of the closure means to a position beyond its normal open position;

and counterbalance means extending between the vehicle body and the closure means;

the counterbalance means being disconnectable to permit movement of the closure means beyond its normal open position;

release of the hinge devices and disconnection of the counterbalance means permitting substitution of closure means of varying configurations, thereby to change the appearance of the rear end of the vehicle body.

2. A vehicle body according to claim 1, in which:

the cam means comprises a cam surface on the hinge device and the cam responsive means comprises a spring-biased pin axially movable within the tubular member as the cam responsive means passes over the cam surface;

the pin having a relief portion permitting retraction of the detent means out of cylindrical sleeve detenting position.

3. The vehicle body according to claim 2, in which:

the counterbalance means comprises at least one air spring operative to counterbalance the closure means during movement between fully closed and normal open position;

the air spring being substantially fully extended in closure means normal open position to restrict the opening movement of the latter;

the air spring being disconnectible from the closure means to permit movement beyond the normal fully opened position.

* * * * *